United States Patent
Nakamura et al.

(10) Patent No.: US 9,522,666 B2
(45) Date of Patent: Dec. 20, 2016

(54) HOUSING AND MASTER CYLINDER DEVICE

(71) Applicants: NISSIN KOGYO CO., LTD., Ueda-Shi, Nagano (JP); HONDA MOTOR CO., LTD., Minato-Ku, Tokyo (JP)

(72) Inventors: Motoyasu Nakamura, Ueda (JP); Kazuaki Murayama, Wako (JP); Takaaki Ohnishi, Wako (JP)

(73) Assignees: Autoliv Nissin Brake Systems Japan Co., Ltd., Nagano (JP); Honda Motor Co., Ltd., Tokyo (JP)

( * ) Notice: Subject to any disclaimer, the term of this patent is extended or adjusted under 35 U.S.C. 154(b) by 130 days.

(21) Appl. No.: 14/389,394

(22) PCT Filed: Mar. 29, 2013

(86) PCT No.: PCT/JP2013/059717
§ 371 (c)(1),
(2) Date: Sep. 30, 2014

(87) PCT Pub. No.: WO2013/147248
PCT Pub. Date: Oct. 3, 2013

(65) Prior Publication Data
US 2015/0082979 A1    Mar. 26, 2015

(30) Foreign Application Priority Data

Mar. 30, 2012 (JP) .................................. 2012-083302

(51) Int. Cl.
*B60T 8/44* (2006.01)
*B60T 17/08* (2006.01)
(Continued)

(52) U.S. Cl.
CPC ................ *B60T 17/08* (2013.01); *B60T 8/368* (2013.01); *B60T 8/4081* (2013.01); *F16J 10/02* (2013.01)

(58) Field of Classification Search
CPC .. B60T 13/686; B60T 8/4081; B60T 2220/04; B60T 8/328; B60T 8/3675; B60T 8/4086; B60T 8/409
(Continued)

(56) References Cited

U.S. PATENT DOCUMENTS 3,738,232 A    6/1973    Kado
6,347,845 B1   2/2002   Engfer et al.
(Continued)

FOREIGN PATENT DOCUMENTS

CN    101298245 A    11/2008
JP    H07-47940 A     2/1995
(Continued)

OTHER PUBLICATIONS

Chinese Office Action, dated Mar. 15, 2016, issued in the corresponding patent application 201380016575.6 with English translation thereof.

*Primary Examiner* — Thomas J Williams
*Assistant Examiner* — Mahbubur Rashid
(74) *Attorney, Agent, or Firm* — Carrier Blackman & Associates, P.C.; William D. Blackman; Jingli Wang (57) ABSTRACT

A lid member has an external shape inscribing a quadrilateral formed by two sets of two facing sides, and has: a pair of first cut-out sections configured by cutting out, in the same size, a pair of diagonal corners from among the two sets of diagonal corners of the quadrilateral; and a pair of second cut-out sections configured by cutting out the other diagonal corners in the same size. The outer shape of the lid member is formed in a point-symmetric shape relative to the
(Continued)

center of an opening in a peripheral wall section. The first cut-out sections have a larger surface area than the second cut-out sections, and one out of the pair of first cut-out sections is configured so as to be arranged in the vehicle progression direction and at the bottom in the vertical direction, when a base body is mounted to a vehicle.

8 Claims, 8 Drawing Sheets

(51) Int. Cl.
    *B60T 8/36*     (2006.01)
    *B60T 8/40*     (2006.01)
    *F16J 10/02*     (2006.01)

(58) Field of Classification Search
    USPC ..... 303/119.2, 119.3, 113.4, 14; 60/545, 538
    See application file for complete search history.

(56) References Cited

U.S. PATENT DOCUMENTS

| | | |
|---|---|---|
| 2004/0113488 A1 | 6/2004 | Sekihara |
| 2008/0272646 A1 | 11/2008 | Nakazawa et al. |
| 2009/0195060 A1* | 8/2009 | Nishikawa ............ B60T 8/3225 303/116.1 |
| 2011/0155414 A1 | 6/2011 | Yasukawa et al. |
| 2012/0298897 A1* | 11/2012 | Nakamura ............ B60T 8/3675 251/129.15 |
| 2013/0032597 A1* | 2/2013 | Anderson ............. B65F 1/1468 220/324 |
| 2013/0139501 A1* | 6/2013 | Matsunaga ................ F15B 1/26 60/562 |
| 2013/0192222 A1* | 8/2013 | Nomura ................ B60T 8/4077 60/545 |
| 2013/0232966 A1* | 9/2013 | Murayama .............. B60T 7/042 60/545 |
| 2014/0298797 A1* | 10/2014 | Murayama ............. B60T 8/368 60/533 |

FOREIGN PATENT DOCUMENTS

| | | |
|---|---|---|
| JP | H07-47947 A | 2/1995 |
| JP | 2002-508276 A | 3/2002 |
| JP | 2004168281 A | 6/2004 |
| JP | 2006-117076 A | 5/2006 |
| JP | 2006-213072 A | 8/2006 |
| JP | 2007-099057 A | 4/2007 |
| JP | 2011-135712 A | 7/2011 |

* cited by examiner

HOUSING AND MASTER CYLINDER DEVICE

TECHNICAL FIELD

The present invention relates to a housing for housing electric parts, etc. and a master cylinder device.

BACKGROUND ART

Conventionally, as such a kind of housing, there is a known housing for a master cylinder device in a vehicle brake system for controlling a brake fluid hydraulic pressure applied to wheel brakes of a vehicle (automobile) (for example, Patent document 1).

The housing is mounted on a base in which a master cylinder and/or hydraulic passages are provided thereinside to perform roles of housing parts and/or electronic parts such an electromagnetic valve for opening and closing the hydraulic passage, a pressure sensor for detecting the brake hydraulic pressure, etc. Accordingly, the housing is configured to have a capacity able to house these parts.

PRIOR ART

Patent Document

PATENT DOCUMENT1: JP2007-99057

SUMMARY OF INVENTION

Problem to be Solved by Invention

Generally, the housing is disposed together with the master cylinder device inside the engine room having strict restriction regarding layout. Accordingly, there is a request to further save space because it is necessary to provide clearance from the structures and/or peripheral devices in the engine room.

The present invention is provided in consideration of the above-described points and aims to provide a housing and a master cylinder device capable of saving space and preferably providing clearance from peripheral structures and peripheral devices.

Means for Solving Problem

The housing according to the present invention provided to solve these problems is a housing assembled on one surface of a base mounted on a vehicle, comprising:

a circumferential wall member enclosing parts provided to the base; and a lid member mounted on an opening in the circumferential wall member on a side of the one surface of the base, wherein the lid member comprises a contour inscribed on a quadrilateral formed with two pairs of two sides facing each other, and further comprises first cut-out parts formed by cutting out one of the pair of diagonal corners of the quadrilateral, the first cut-out parts having the same size and a second cut-out part formed by cutting out the other of the pair of diagonal corners, the second cut-out parts having the same size, wherein the counter of the lid member is formed in a point-symmetrical shape with respect to a center of the opening, wherein an area of the first cut-out part is greater than an area of the second cut-out part, and wherein one of the pairs of the first cut-out parts is arranged at a part which is front in the front direction of the vehicle and low in the vertical direction when the base is mounted on the vehicle.

As the parts, an electromagnetic valve, a pressure sensor, a control device (electronic control unit) for controlling an electromagnetic valve, mechanical parts, etc are usable.

According to the housing of the present invention, the area of the first cut-out part is made greater than that of the second cut-out part, so that space saving is provided by the difference therebetween. One of a pair of the first cut-out parts is disposed at a front part in a vehicle forward direction and at a lower part in a vertical direction. Accordingly, for example, inside an engine room and the housing (a lid member) are disposed near peripheral structures thereraround and peripheral devices with the clearance kept. This enhances a degree of freedom in layout of the inside of the engine room.

Further, because a contour of the lid member is formed in a point symmetrical shape with respect to a center of an opening of a peripheral wall part of the lid member, though the first cut-out part has an area which is different from that of the second cut-out part, this does not cause difference in an arranging direction of the lid member during assembling. This provides easiness in assembling the lid member.

In addition, the housing according to the present invention further comprises a plurality of boss members in which the thread through holes are formed, wherein at least a part of the thread through holes is arranged in at least one of the first cut-out part and the second cut-out part.

According to the housing, the thread through hole can be provided near the housing. This provides saving a space. In addition, because the thread through hole can be arranged near the housing, a quantity of protrusion of the boss member can be made small, so that a miniaturization of the base can be provided.

Further, in the housing according to the present invention, the circumferential wall member is provided with a plurality of connectors thereon protrusively, and wherein center axis lines of the connectors are arranged orthogonally with one of the sides.

According to the housing, a plurality of connectors are provided together on any one of sides of the quadrilateral, which makes it hard for a plurality of connectors to interfere with the first cut-out part and the second cut-out part, so that the space formed at the first and second cut-out parts can be effectively used. Further, a plurality of the connectors are provided together on one of sides, which facilitates to attach sockets to and detach sockets from a plurality of connectors.

In the housing according to the present invention, a plurality of connectors comprise two of the connectors protrusively mounted on the circumferential wall member, wherein the two of connectors are protrusively arranged in the front direction of the vehicle between the first cut-out part arranged at a part which is front in the front direction of the vehicle and a part which is low in the vertical direction when the base is mounted on the vehicle and the second cut-out part arranged at an upper part in the vertical direction when the base is mounted on the vehicle, and wherein one of the connectors provided on a side near the first cut-out part has a quantity of protrusion from the circumferential wall which is smaller than a quantity of protrusion of the other of the connectors from the circumferential wall.

According to the housing, one of the two connectors, having a smaller size, is arranged near the first cut-out part having a cut-out quantity is larger, so that it becomes easy to secure a vacant space at the first cut-out part and its vicinity. Accordingly, for example, this makes it possible that the housing is arranged near a structure or peripheral device in the engine room. Therefore, this can enhances a degree of freedom in layout in the engine room.

In the housing according to the present invention, the lid member includes a plurality of the hollow parts at a circumferential edge of the lid member, wherein the number of the hollow parts formed in the circumferential edge facing the first cut-out part is greater than the number of the hollow parts formed in the circumferential edge of the lid member facing the second cut-out part.

According to the housing, for example, this configuration prevents the circumferential edge of the lid member 30 from bending and having distortion when the lid member 30 is fixed by welding, etc. Particularly, in the first and second cut-out part parts, a bend and distortion can be preferably prevented, so that a sealing property of the lid member can be enhanced. Further, the hollow parts can provide lighting holes at circumferential edge of the lid member.

Further, in the housing according to the present invention at least one of the first cut-out part and the second cut-out part is formed in a triangle shape.

According to the housing, because the circumferential edge facing the cut-out part becomes linear, the areas of the cut-out parts are made larger than those in a case where parts of the peripheral edges facing the cut-out parts are formed to protrude outwardly. Space saving can be provided by the difference.

Further, in the housing according to the present invention, the base is mounted on a master cylinder device to which an operation on a brake controller is inputted.

According to the housing, because the housing is provided in the master cylinder device, this preferably enhances the degree of freedom in layout of the engine room.

More specifically, in the engine room, as the structures, there are various types of devices which are not only the brake-relating device but also drive source (engine and/or travelling motor), a transmission, a cooling system such as a radiator, and a low-voltage battery are mounted, so that it becomes difficult to secure a large unused space (installation space). However, in the present invention it is aimed to save a space in the housing included in the master cylinder device. Accordingly, the master cylinder device can be preferably arranged because even in the narrow engine room having large restriction in layout the housing can be arranged near the structure and peripheral devices in which clearance is secured.

Further, according to the present invention, a master cylinder device, a part of which is arranged in an engine room, the master cylinder device being arranged in the engine room provided with a housing for housing parts, the housing comprising: a circumferential wall member enclosing the parts provided to the base and a lid member mounted on an opening in the circumferential wall member on a side of one of the surfaces of the base, wherein the lid member comprises a contour inscribed on a quadrilateral formed with two pairs of two sides, and further comprises first cut-out parts formed by cutting out one of the pair of diagonal corners of the quadrilateral, the first cut-out parts having the same size and second cut-out parts formed by cutting out the other of the pair of diagonal corners, the second cut-out parts having the same size, wherein the counter of the lid member is formed in a point-symmetrical shape with respect to a center of the opening, wherein an area of the first cut-out parts is greater than an area of the second cut-out parts, and wherein one of the pairs of the first cut-out parts is arranged at a part of the base which is front in the front direction of the vehicle and low in the vertical direction when the base is mounted on the vehicle.

According to the master cylinder device, a degree of freedom in layout of the engine room can be enhanced.

More specifically, because in the present invention, it is aimed to save a space in the housing included in the master cylinder device, the master cylinder device can be preferably arranged because even in the narrow engine room having restriction in layout, the housing can be arranged near the structure and peripheral device in which a clearance is secured.

Advantageous Effect of Invention

According to the present invention, because it is aimed to save a space in the housing included in the master cylinder device, the housing and the master cylinder device can be provided which can preferably provides clearance with peripheral structures and peripheral devices.

BRIEF DESCRIPTION OF DRAWINGS

FIGS. 4A to 4C are drawings showing a lid member in which

FIG. 5A and FIG. 5B are drawings showing a housing body of the housing in which

FIG. 6A and FIG. 6B are drawings showing the housing body in which

FIGS. 7A and 7B are drawings showing the housing body in which

MODES FOR CARRYING OUT INVENTION

Figure 1:
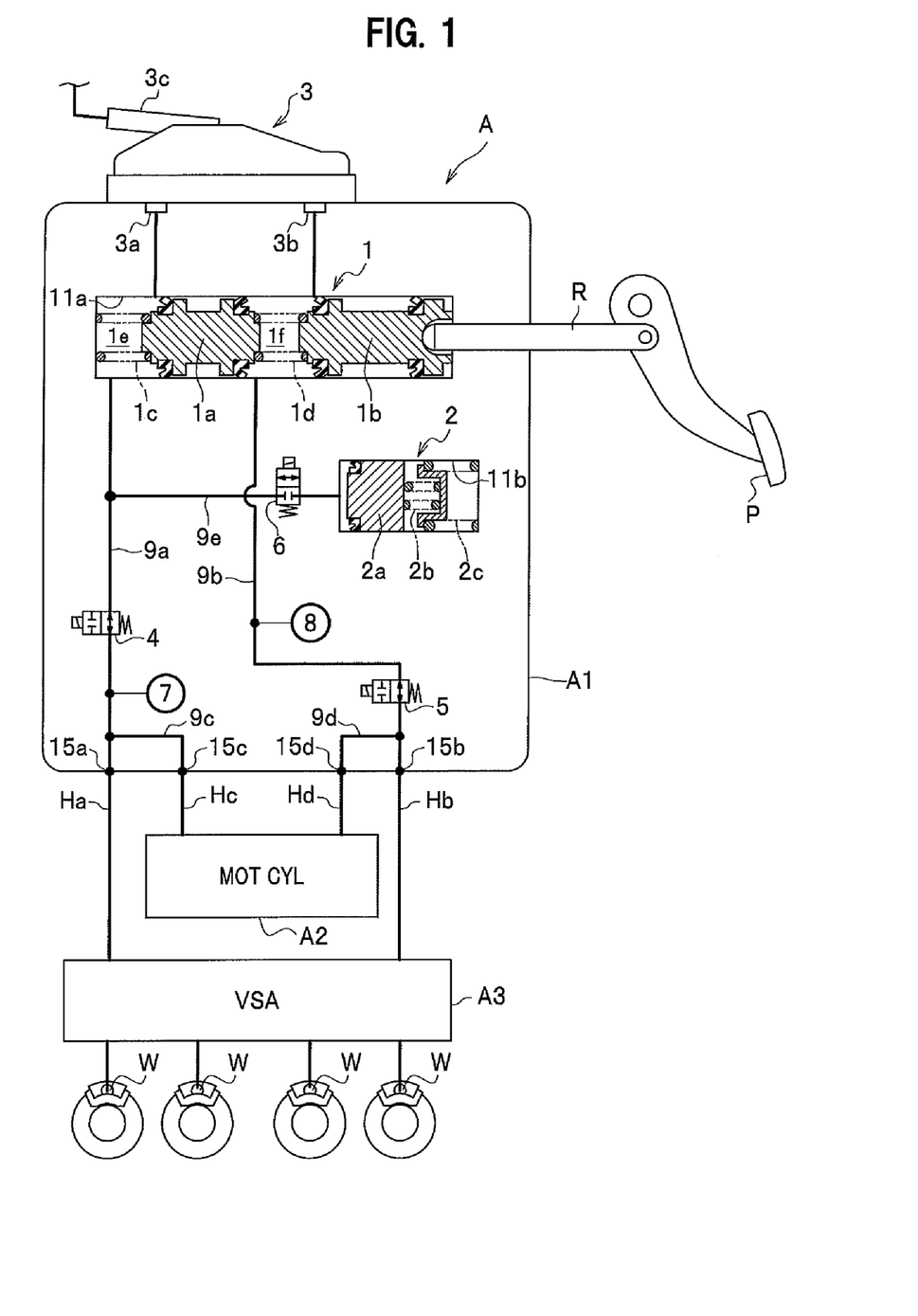
FIG. 1 is a general block diagram of a vehicle brake system having a master cylinder device on which a housing according to embodiments of the present invention is mounted.

A vehicle brake system A shown in FIG. 1 includes both the brake system of a brake-by-wire system which operates upon operation of a power plant (engine and motor, etc) and a hydraulic type of brake system operating upon emergency or stop of the power plant, that is, includes a master cylinder device A1 for generating a brake hydraulic pressure by a pressure force on a brake pedal P (brake controller) and a motor cylinder device A2 for generating the brake hydraulic pressure using an electric motor (not shown), and a Vehicle Stability Assist device A3 (referred to as "hydraulic controller A3") for assistance to stabilize behavior of the vehicle. The master cylinder device A1, the motor cylinder device A2, and the hydraulic controller A3 are configured as separated units and connected through external tubes.

The vehicle brake system A can be also mounted on hybrid vehicles further using at least a motor and electric/fuel cell vehicles using only at least a motor as a power source in addition to the vehicle using an engine (internal combustion engine) as a power source.

The master cylinder device A1 includes a tandem type of master cylinder 1, a stroke simulator 2, a reservoir 3, a normal-open cutoff valves (electromagnetic valves) 4, 5, a normal-close cutoff valve (electromagnetic valve) 6, pressure sensors 7, 8, main hydraulic passages 9a, 9b, connecting hydraulic passages 9c, 9d, and a dividing hydraulic passage 9e.

The tandem type of master cylinder 1 is a device for converting a depressing force on the brake pedal P into a brake hydraulic pressure and includes a first piston 1a disposed on a bottom wall side of a first cylinder hole 11a, a second piston 1b connected to a push rod R, a first return spring 1c disposed between the first piston 1a and a bottom wall of the first cylinder hole 11a, and a second return spring 1d disposed between the first return spring 1c and the second return spring 1d. The second piston 1b is connected to the brake pedal P through the push rod R. Both the pistons 1a, 1b slide in response to a depression force on the brake pedal P and pressurize brake fluids in pressure chambers 1e, 1f. The pressure chambers 1e, 1f are communicated with the main hydraulic passages 9a, 9b, respectively.

The stroke simulator 2 is a device for generating a simulated operation reaction force and includes a piston 2a slidable in a second cylinder hole 11b, and two return springs 2b, 2c having large and small sizes for actuating the pistons 2a, 2a, respectively. The stroke simulator 2 communicates with the pressure chamber 1e through the main hydraulic passage 9a and the dividing hydraulic passage 9e and operates by the brake hydraulic pressure generated in the pressure chamber 1e.

The reservoir 3 is a container for storing a brake fluid and includes fill openings 3a, 3b connected to the tandem type of master cylinder 1 and a tube-connection opening 3c connected to a hose extending from a main reservoir (not shown).

The normal-open cutoff valves 4, 5 are devices for opening and closing the main hydraulic passages 9a, 9b respectively, and the both comprise normal-open type of electromagnetic valves, respectively. One of them, i.e., the normal-open cut off valve 4 opens and closes the main hydraulic passage 9a in a section from a joint between the main hydraulic passage 9a and the dividing hydraulic passage 9e to a joint between the main hydraulic passage 9a and the connecting hydraulic passage 9c. The other of them, i.e., the normal-open cutoff valve 5 opens and closes a main hydraulic pressure passage 9b on an upstream side of a joint between the main hydraulic passage 9b and a connecting hydraulic passage 9d.

The normal-close cutoff valve 6 opens and closes the dividing hydraulic passage 9e and comprises a normal-close type electromagnetic valve.

The pressure sensors 7, 8 are devices for detecting magnitudes of the brake hydraulic pressures and mounted in sensor mounting holes (not shown) communicating with the main hydraulic passages 9a, 9b, respectively. One of them, i.e., the pressure sensors 7, is disposed on a downstream side of the normal-open cutoff valve 4 and detects a brake hydraulic pressure generated by the motor cylinder device A2 when the normal-open cutoff valve 4 is in a closed status (=a status in which the main hydraulic passage 9a is closed). The other one of them, i.e., a pressure sensor 8, is disposed on an upstream side of the normal-open cutoff valve 5 and detects a brake hydraulic pressure generated by the tandem type of master cylinder 1 in a status in which the normal-open cutoff valve 5 is closed (=a status in which the main hydraulic pressure passage 9b is closed). Data obtained by the pressure sensors 7, 8 is sent to an electronic control unit (ECU) (not shown).

The main hydraulic passages 9a, 9b are hydraulic passages starting from the tandem type of master cylinder 1. Output ports 15a, 15b, which are end points of the main hydraulic passages 9a, 9b, are connected to tube members Ha, Hb extending to the hydraulic controller A3.

The connecting hydraulic passages 9c, 9d are hydraulic passages extending from input ports 15c, 15d to the main hydraulic passages 9a, 9b, respectively. The input ports 15c, 15d are connected to tube members Hc, Hd extending to the motor cylinder device A2, respectively.

The dividing hydraulic passage 9e is a hydraulic passage branched from the main hydraulic passage 9a on one side and extends to the stroke simulator 2.

The master cylinder device A1 communicates with the hydraulic controller A3 through the tube members Ha, Hb and input the brake hydraulic pressures generated by the tandem type of master cylinder 1, in an open valve status of the normal-open cutoff valves 4, 5, into the hydraulic controller A3 through the main hydraulic passages 9a, 9b and the tube members Ha, Hb.

The motor cylinder device A2 includes (not shown) a slave piston slidable in the slave cylinder, an actuator mechanism including an electric motor and a drive force transmitting unit, and a reservoir for storing the brake fluid in the slave cylinder.

The electric motor operates on the basis of the signal from an electronic control unit (not shown). The drive force transmitting unit converts a rotational drive force of the electric motor into a reciprocating motion and transmits the converted force to the slave piston. The slave piston slides in the slave cylinder in response to the drive force of the electric motor to pressurize the brake fluid in the slave cylinder.

The brake hydraulic pressure generated by the motor cylinder device A2 is inputted into the master cylinder device A1 through connecting hydraulic passages 9c and 9d and the tube members Hc, Hd and into the hydraulic controller A3 through the tube members Ha, Hb. The reservoir is connected to a hose extending from a main reservoir (not shown).

The hydraulic controller A3 includes such a configuration as to conduct antilock braking control (ABS control) for suppressing slip of wheels and side skidding control and traction control for stabilizing behavior of the vehicle and is connected to a wheel cylinders W, W, - - - through tube members. In addition, though not shown in Figures, the hydraulic controller A3 includes a hydraulic unit in which an electromagnetic valve and a pump are installed, a motor for driving the pump, an electronic control unit for controlling the electromagnetic valve and the motor, etc.

Next, an operation of a vehicle brake system A will be generally described.

In a normal status in which the vehicle brake system A operates normally, the normal-open cutoff valves 4 and 5 become in a valve-closing status, and the normal-close cutoff valve 6 becomes in a valve-opening status. When the brake pedal P is operated in this status, the brake hydraulic pressure generated by the tandem type of master cylinder 1 is not transmitted to the wheel cylinder W but transmitted to the stroke simulator 2, where the piston 2a is displaced, which allows a stroke of the brake pedal P and a simulated operation reaction force is applied to the brake pedal P.

Further, when the depression on the brake pedal P is detected by a stroke sensor (not shown), etc., an electric motor of the motor cylinder device A2 is driven, so that displacement of the slave piston pressurizes the brake fluid in the cylinder.

The electronic control unit (not shown) compares the brake hydraulic pressure outputted by the motor cylinder device A2 (brake fluid pressure detected by the pressure sensor 7) with the brake hydraulic pressure (brake fluid pressure) outputted by the tandem type of master cylinder 1 (brake fluid pressure detected by the pressure sensor 8) and controls the rotation speed, etc. of the electric motor on the basis of the comparing result.

The brake hydraulic pressure generated by the motor cylinder device A2 is transmitted to the wheel cylinders W, W, - - - through the hydraulic controller A3, so that braking forces are applied to the wheels by operation of cylinders W, respectively.

Further, in such a status that the motor cylinder device A2 does not operate (for example, in a case where an electric power cannot be obtained or emergency case, both the normal-open cutoff valves 4, 5 become in valve-open statuses, so that the normal-close cutoff valve 6 becomes in a valve-closing status. Accordingly, the brake hydraulic pressure generated in the tandem type of master cylinder 1 is transmitted to the wheel cylinders W, W, - - - .

Next, a more specific structure of the master cylinder device A1 will be described.

The master cylinder device A1 according to the embodiment is formed by mounting above-described various parts on an inside or an outside of the base 10 and covering an electric parts operating with electric power (the normal-open cutoff valves 4, 5, the normal-close cutoff valve 6, and the pressure sensors 7, 8 (see FIG. 1)) with a housing 20. Further, it is also possible that mechanical parts or the like are housed in the housing 20.

The base 10 is a casting with an aluminum alloy and includes a cylinder unit 11 (see FIG. 2B, the same shall apply hereinafter), a vehicle fixing unit 12, a reservoir mounting part 13 (see FIG. 2B, a same is applied hereinafter), a housing mounting part 14, and the tube connecting part 15. In addition, inside the base 10, through holes forming the main hydraulic passages 9a, 9b, the dividing hydraulic passage 9e (not shown), etc. are formed.

In the cylinder unit 11, the first cylinder hole 11a for the master cylinder and the second cylinder hole 11b for the stroke simulator (both shown with broken lines in FIG. 2B) are formed. Both the cylinder holes 11a, 11b have hollow cylindrical shapes with bottoms and open at the vehicle fixing unit 12 and extend toward the tube connecting part 15. Inserted into the first cylinder hole 11a are parts forming the tandem type of master cylinder 1 (see FIG. 1), (the first piston 1a, the second piston 1b, the first return spring 1c and the second return spring 1d). Inserted into the second cylinder hole 11b are parts forming the stroke simulator 2 (the piston 2a and the return springs 2b, 2c).

The vehicle fixing unit 12 is fixed to a vehicle side fixing part such as a toe board 50 (see FIG. 8A), etc. The vehicle fixing unit 12 is formed on a rear surface part of the base 10 and has a flange shape. At a circumferential edge part of the vehicle fixing unit 12 (a part protruding from the cylinder unit 11), a bolt insertion hole (not shown) is formed in which a bolt 12a is fixed.

Figure 2A:
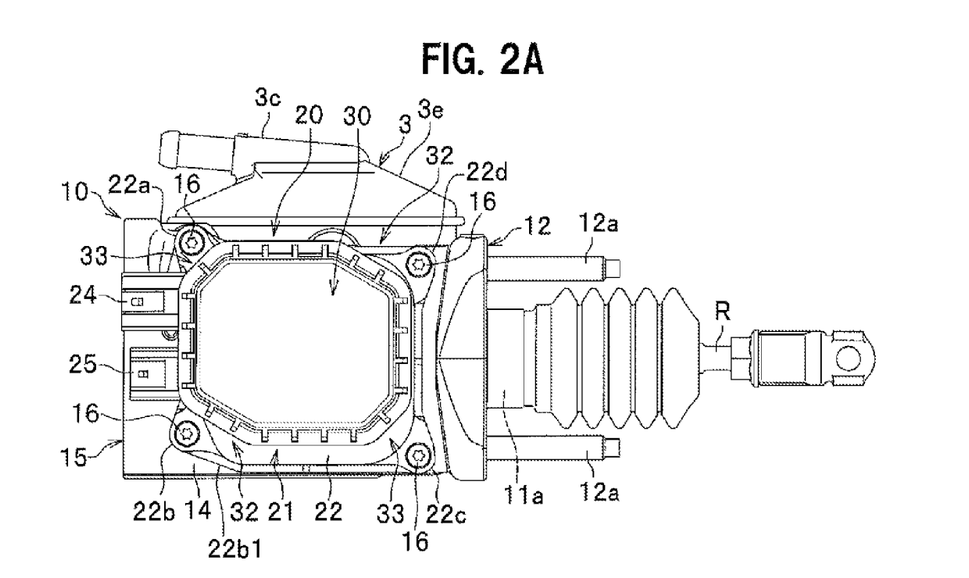
FIG. 2A is a side view of the master cylinder device.
Figure 2B:
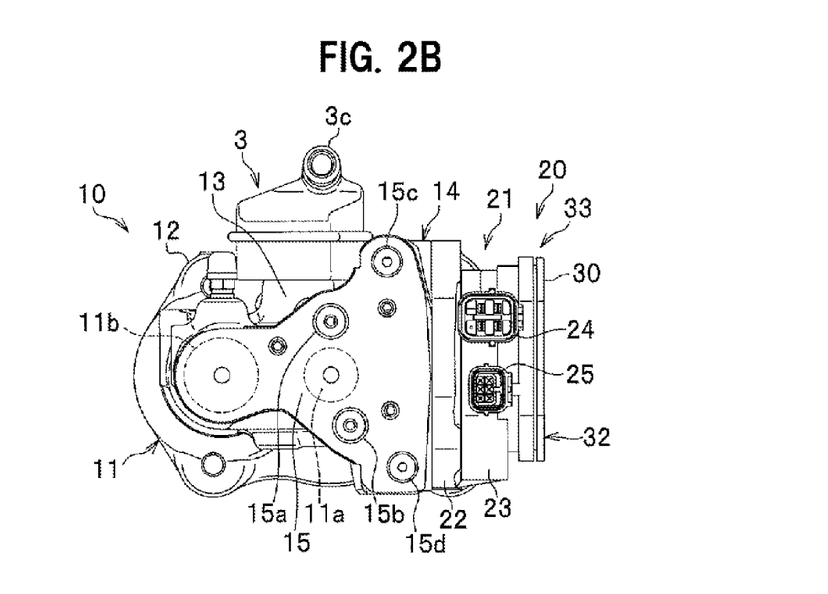
FIG. 2B is a front view of the master cylinder device.

As shown in FIG. 2A, a reservoir mounting part 13 is a part which becomes a mounting seat for the reservoir 3. Two reservoir mounting parts 13 are formed at an upper surface part of the base 10 (only one of them is shown). Mounted on the reservoir mounting part 13 is a reservoir union port. Further, the reservoir 3 is fixed to the base 10 through a connecting part (not shown) protrusively formed on an upper surface 10.

The reservoir union port has a hollow cylindrical shape and communicates with the first cylinder hole 11a through a hole extending from a bottom surface thereof toward the first cylinder hole 11a. The reservoir union port is connected to a fluid supply inlet (not shown) formed protrusively at a lower part of the reservoir 3, and a container body of the reservoir 3 is placed on an upper end of the reservoir union port.

The housing mounting part 14 is installed on a side surface of the base 10. The housing mounting part 14 is a mounting seat for mounting the housing 20. The housing mounting part 14 has a flange shape. At an upper end and a lower end of the housing mounting part 14, female threads (not shown) are formed. The mounting screws 16 are screwed into the female threads as shown in FIG. 2A to fix the housing 20 to the housing mounting part 14 (a side surface of the base 10).

Though not shown, three holes for mounting valves and two holes for mounting sensors are formed in the housing mounting part 14. The normal-open cutoff valves 4, 5 and the normal-close cutoff valve 6 (see FIG. 1) are assembled into the three holes for mounting valves, and the pressure sensors 7, 8 (see FIG. 2) are assembled into the two holes for mounting sensors.

The tube connecting part 15 is a part to be a tube mounting seat, and, as shown in FIG. 2A, formed in a front surface part of the base 10. Formed at the tube connecting part 15 are the two output ports 15a, 15b and two input ports 15c, 15d as shown in FIG. 2B. Connected to the output ports 15a, 15b are the tube members Ha, Hb (see FIG. 1) extending to the hydraulic controller A3, and connected to the input ports 15c, 15d are the tube members Hc, Hd (see FIG. 1) extending to the motor cylinder device A2.

The housing 20 includes a housing body 21 hermetically covering the parts assembled with the housing mounting part 14 (normal-open cutoff valves 4, 5, the normal-close cutoff valve 6, and the pressure sensors 7, 8, (see FIG. 1, the same shall apply hereinafter), a lid member 30 mounted on an opening 21a (see FIG. 3) of the housing body 21 on a side of a side surface of the base 10.

Figure 3:
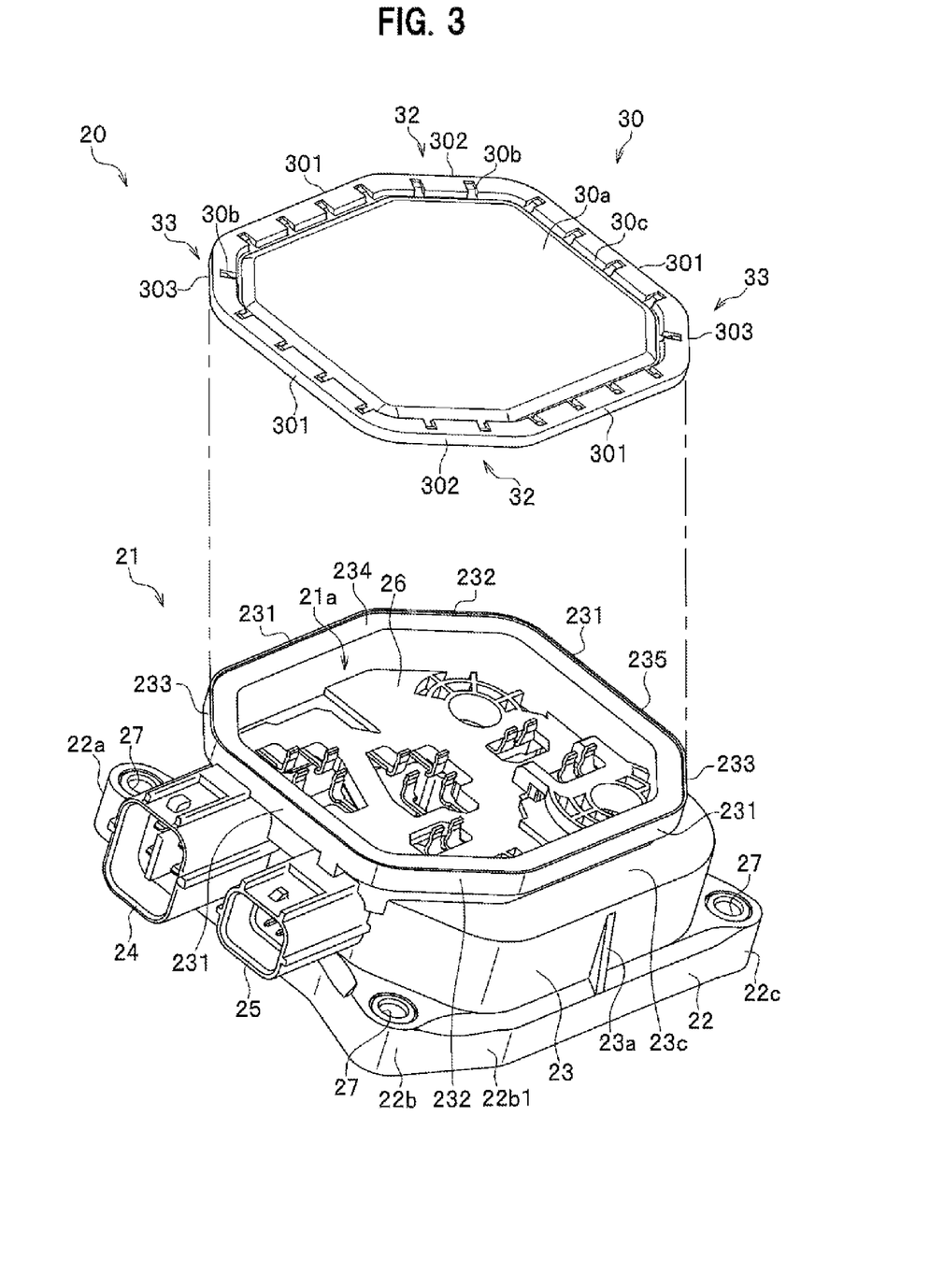
FIG. 3 is an exploded perspective view of the housing.

The housing body 21 includes, as shown in FIG. 3, a flange member 22, a circumferential wall member 23 standing on the flange member 22, and two connectors 24, 25 formed protrusively from the circumferential wall surface of the circumferential wall member 23 as a connector member.

Though not shown, housed inside the circumferential wall member 23 of the housing body 21 are electromagnetic coils for driving the normal-open cutoff valves 4, 5 and the normal-close cutoff valve 6, electromagnetic coils, bus bars extending to the pressure sensors 7, 8, etc.

The flange member 22 is a part which is pressure-bonded to the housing mounting part 14 (see FIG. 2B, the same shall apply hereinafter). The flange member 22 is formed, as shown in FIG. 5A, to protrude outside the housing body 21 so as to continue to boss members 22a to 22d as mounting thread parts.

The boss members 22a to 22d are provided at four corners of the housing body 21 at positions agreeing positions of the female threads of the housing mounting part 14, respectively. The boss members 22a to 22d have metal collars buried, respectively. Formed inside the collars are thread through holes 27 functioning as through holes, respectively. Mounting screws 16 (see FIG. 2A, the same shall apply hereinafter) as connecting members are inserted into the thread through hole 27, respectively. Fixing the housing 20 to the housing mounting part 14 of the 10 (see FIG. 2A) is done by evenly screwing the mounting screws 16, respectively.

Figure 5A:
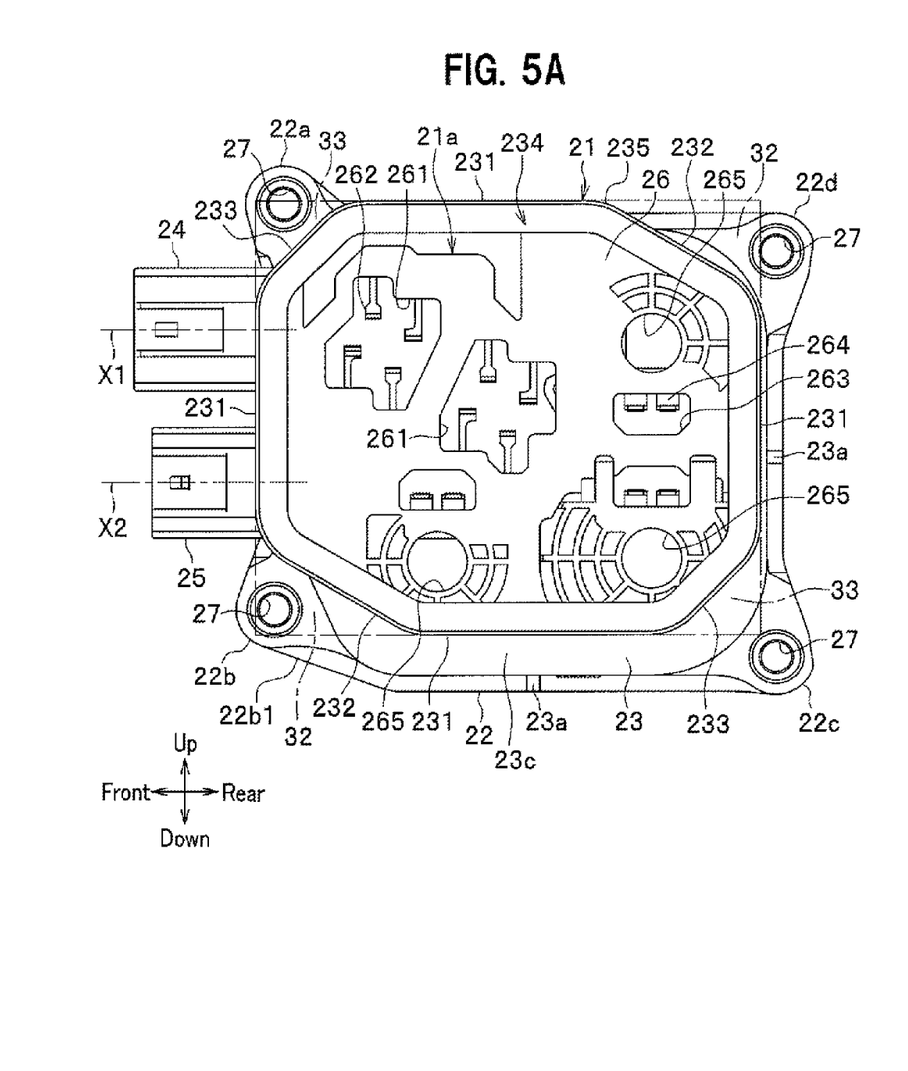
FIG. 5A is a side view and FIG. 5B is a rear view.

As shown in FIG. 5A, a flange part 22b1 continuing to the flange part 22b1 has a lower surface which is inclined. The inclination of the flange part 22b1 is provided to corresponding to the inclination of a first inclined edge 232 of the circumferential wall member 23 described later. This provides space saving.

Further, a surface facing the housing mounting part 14 of the flange member 22 has a circumferential channel (not shown) formed therein, and a seal member made of synthetic rubber is fitted in the circumferential channel. The seal member function for holding liquid hermetic property of the housing body 21 such that the seal member tightly contacts the housing mounting part 14 by fastening the mounting screws 16.

Figure 5B:
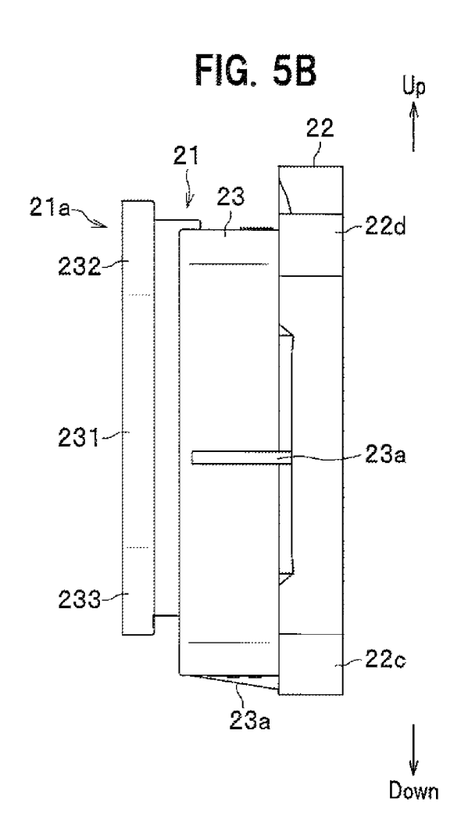

As shown in FIG. 5A, ribs 23a are formed at appropriate positions on an outer circumferential surface of the circumferential wall member 23. The rib 23a is, as shown in FIG. 5B, formed from the circumferential wall member 23 to the flange member 22.

As shown in FIG. 3 and FIG. 5A, a partition wall 26 is formed inside the circumferential wall member 23. The partition wall 26 is formed to be opened to have a sensor connection through hole 261 for connection of the pressure sensors 7, 8, a coil connection hole 263, and an electromagnetic valve insertion through hole 265 (insertion through holes for the normal-open cutoff valves 4, 5 and the normal-close cutoff valve 6). In the sensor connection hole 261 and coil connection holes 263, 264 are arranged.

As shown in FIG. 3, the lid member 30 is mounted on an opening edge 234 of the circumferential wall member 23. The lid member 30 is fixed to the opening edge 234 by bonding means such as an adhesive, Ultrasonic Welding, etc.

The opening edge 234 has a shape corresponding to an exterior shape of the lid member 30.

Figure 4A:
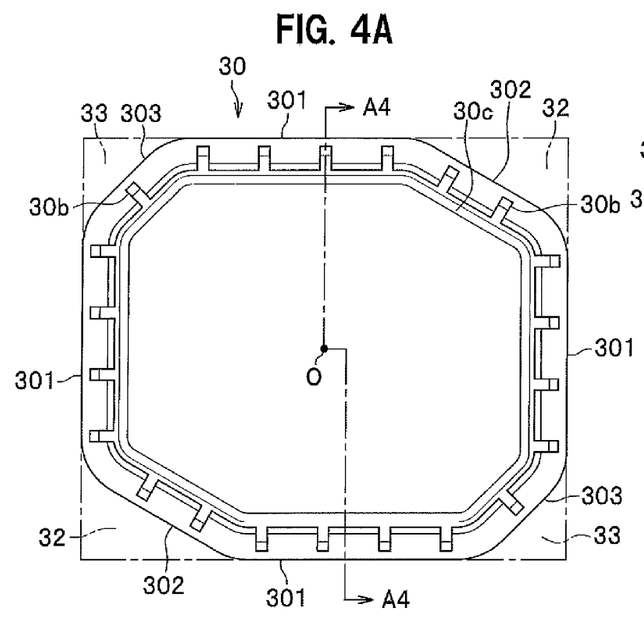
FIG. 4A is a surface view.

As shown in FIG. 4A, the lid member 30 has an exterior shaped in an octagon and in point symmetrical shape on a center O of the opening 21a of the circumferential wall member 23 as shown in FIG. 5A.

The lid member 30 has an exterior shape inscribing a rectangular formed with two pairs of confronting two sides (rectangular shown with dashed line). The lid member 30 includes a pair of the first cut-out parts which are formed by cutting out one of the two pairs of confronting corners to have the same area and second cut-out parts 33 which are formed by cutting out the other of the two pairs of confronting corners to have the same area. The first cut-out parts 32, 32 and the second cut-out parts 33, 33 are formed in triangle shapes.

The lid member 30 includes linear edges 301 extending along side of a rectangular, inclined edges 302, 302, and inclined edges 303 facing the second cut-out parts 33, 33.

The four linear edges 301 are formed to face four side of the quadrilateral and have the same length. The linear edges 301 have two sides which are in parallel each other.

The inclined edges 302, 302 connecting the adjoining linear edges 301, 301 and are in parallel each other. The second inclined edges 303, 303 connect the adjoining linear edges 301, 301 and are in parallel each other.

Cut-out parts 32, 32 have areas (quantity of cut-out) larger than the second cut-out parts 33, 33. As shown in FIG. 2A, one of the cut-out parts 32 is located at a front lower part of the base 10 on a side of the base 10 (a part at a front in the vehicle front direction and a lower part in the vertical direction while the base is mounted on the vehicle). The other of the cut-out part 32 is located at a rear side upper part of the base 10. Regarding lengths of a side of a first cut-out part 32 (the first inclined edge 302) and the second cut-out part 33 (the second inclined edge 303), that of the cut-out part 32 (the inclined edge 302) is larger than that of the inclined edge 302 and the cut-out part 32 has an area (quantity of cutting out) than the second cut-out part 33.

Figure 8A:
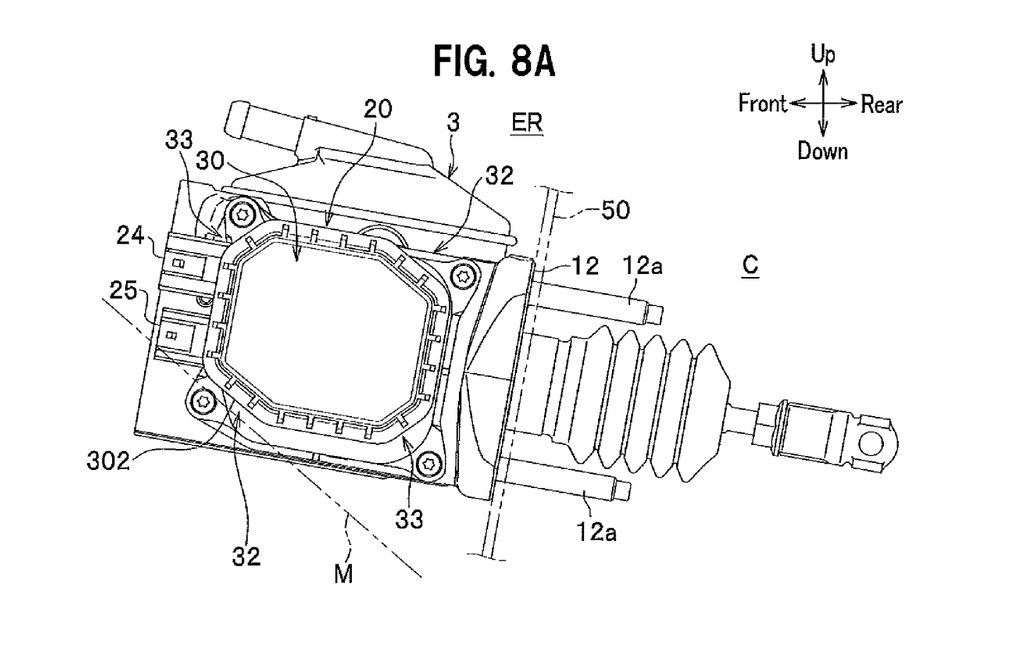
FIGS. 8A and 8B are operation illustrating drawings.

The master cylinder device A1 described later is mounted, as shown in FIG. 8A, such that the front of the base 10 is oriented to the front of the vehicle in an engine room ER. Accordingly, one of the inclined edges 302 is formed at a front lower part of the base 10. More specifically, the one of inclined edges 302 is arranged toward a space where structures and peripheral devices M are easily arranged in the engine room ER.

The second cut-out parts 33, 33 have an area (cutting-out quantity) smaller than the cut-out parts 32, 32. As shown in FIG. 2A, one of the second cut-out parts 33 is arranged to locate at a front upper part of the base 10 (part at a front of the base 10 in the vehicle forward direction and at an upper part of the base 10 in the vertical direction, the same shall apply hereinafter). The other of the second cut-out parts 33 is arranged to locate at a rear and lower part of the base 10. A part of a shape of the thread through hole 27 of the boss member 22a in a side view locates at the second cut-out part 33 formed at the front upper part.

More specifically, the thread through hole 27 is formed near the inclined edge 303 (circumferential wall member 23) using a space of one of the second cut-out parts 33.

It is desirable that a center of the thread through hole 27 is located at the second cut-out part 33 at the front upper part, and it is further desirable that a whole of the thread through hole 27 is located at the second cut-out part 33.

Further, as shown in FIG. 2A, a whole of the shape in side view of the thread through hole 27 formed at the boss 22b locates at the cut-out part 32 at the front lower part.

Formed at a circumferential edge of a surface of the lid member 30 are a plurality of hollow parts 30b arranged in a circumferential direction with intervals, as shown in FIG. 4A.

The number of the hollow parts 30b formed at one of the inclined edges 302 is two, and the number of the hollow parts 30b formed at one of the inclined edges 303 is one. In other words, the number of the hollow parts 30b provided at the circumferential edge facing the cut-out part 32 is greater than the number of the hollow parts 30b provided at the circumferential edge facing the second cut-out part 33.

Each of the four linear edges 301 is provided with the four hollow parts 30b.

Formed inside the circumferential edge of the lid member 30 is a circumferential channel 30c.

Further, the channels are connected between the circumferential channel 30c and each of the hollow parts 30b.

Figure 4B:
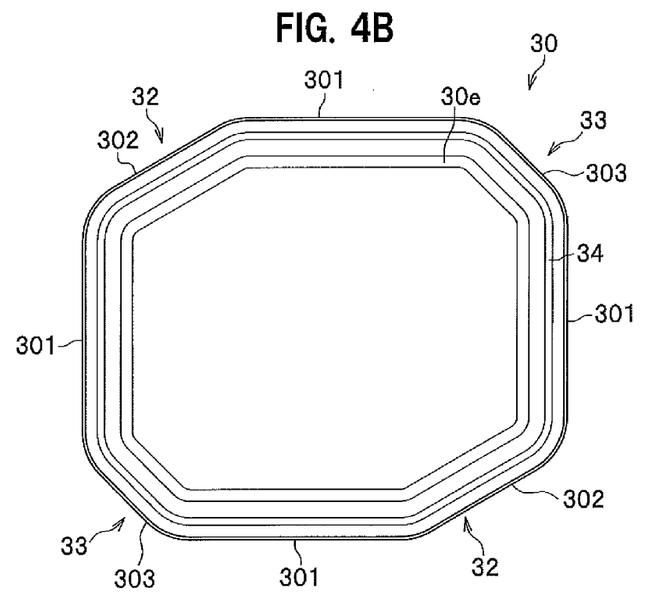
FIG. 4B is a back surface view.
Figure 4C:
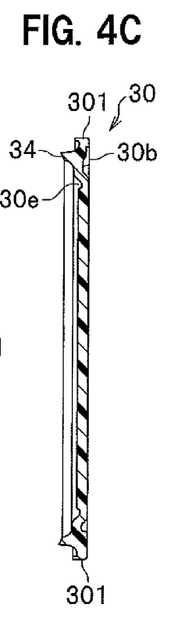
FIG. 4C is a cross section taken along line A4-A4 in FIG. 4A.

As shown in FIG. 4B, a welding part 34 is protrusively formed along the circumferential edge part inside the circumferential edge on the back surface of the lid member 30. Formed inside the welding part 34 is a circumferential channel 30e.

As shown in FIGS. 3 and 5A, the opening edge 234 of the circumferential wall member 23 of a housing body 21 has a shape corresponding to an exterior shape of the lid member 30 and includes four linear edge parts 231, 231 and the first inclined edges 232, 232 and second inclined edge 233s, both connecting adjoining linear edge parts 231 each other.

The four linear edge parts 231 correspond to the linear edges 301 of the lid member 30, respectively. The first inclined edges 232, 232 correspond to the inclined edges 302, 302, and the second inclined edges 233, 233 correspond to the inclined edges 303.

The opening edge 234 has a flat surface and abuts the welding part 34 on the back surface of the lid member 30 and which are welded. Formed at an outer circumferential edge of the opening edge 234 is a circumferential rib 235.

Figure 7A:
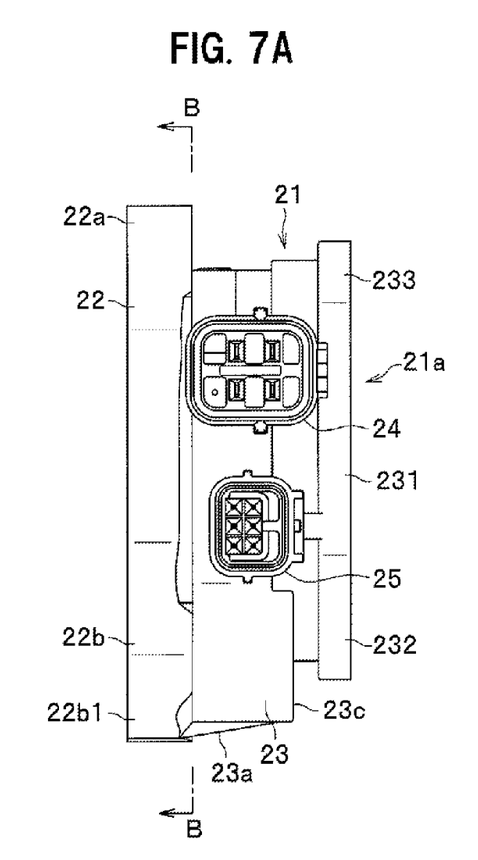
FIG. 7A is a front view and FIG. 7B is a cross section taken along line B-B in FIG. 7B.
Figure 7B:
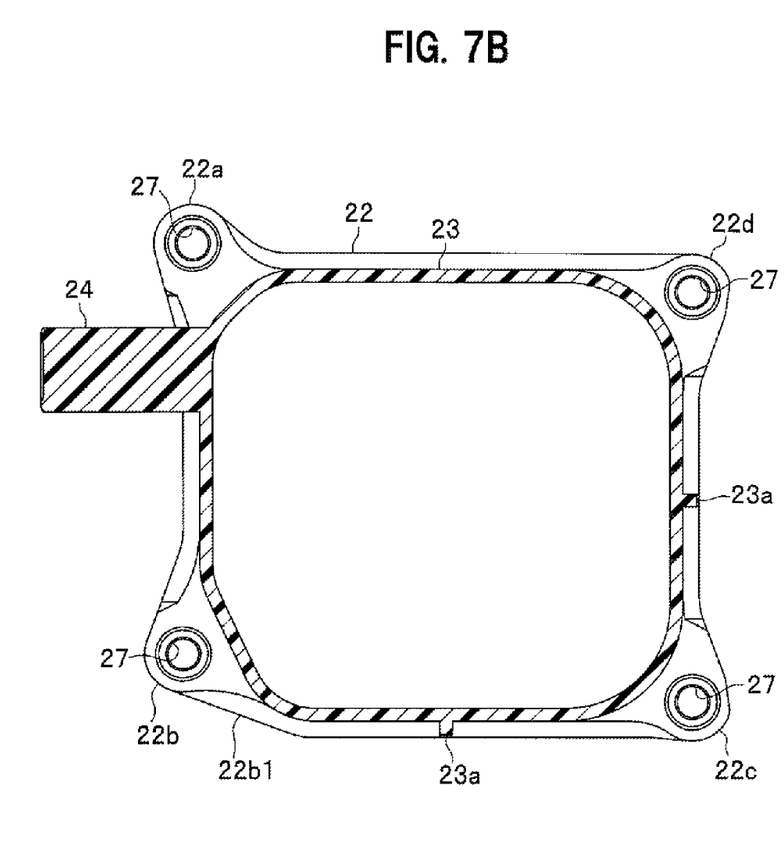

The circumferential wall member 23 is formed to stand inside the flange member 22 in a side view and as shown in FIG. 7B, a cross-sectional shape of the circumferential wall member 23 on a side of the flange member 22 is substantially a square shape. Further, as shown in FIG. 5A, the circumferential wall member 23 includes a step part 23c on a side near the opening 21a so as to have a shape in which a lower part of the circumferential wall member 23 is offset inwardly from the step part 23c.

This allows a part having a relatively large diameter such as a coil to be preferably housed inside the circumferential wall member 23 (see FIG. 7B). Further, the lower part of the circumferential wall member 23 is offset on a side near the opening 21a. This provides space saving around the lower part of the circumferential wall member 23.

Figure 6A:
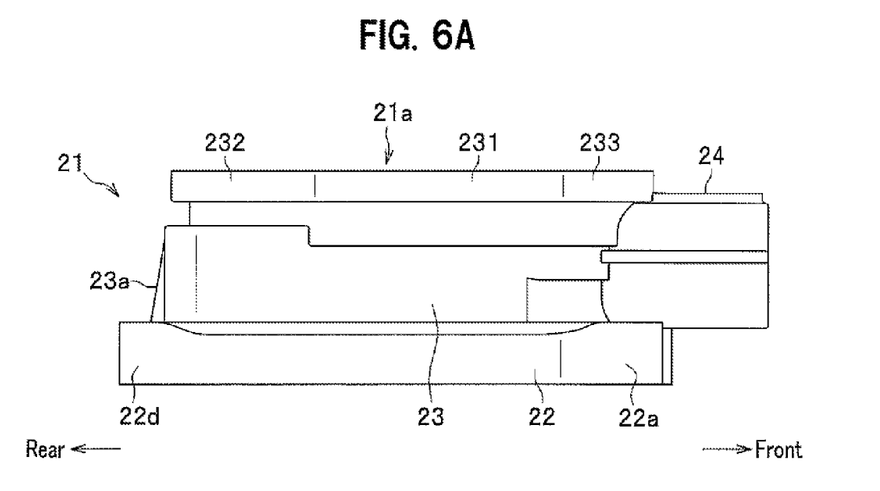
FIG. 6A is a top view and FIG. 6B is a lower surface view.
Figure 6B:
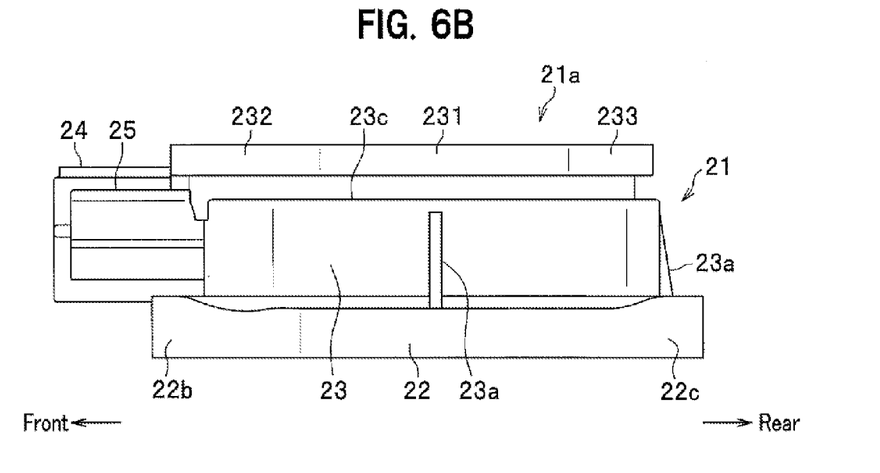

The connectors 24, 25 are, as shown in FIGS. 3, 6A, and 7A, both are arranged in parallel in a circumferential direction of the circumferential wall member 23. The connectors 24, 25 both have hollow cylindrical shapes and provided protrusively from the circumferential wall member 23 to the front of the housing body 21 integrally. The connectors 24, 25 are connected to not-shown cables connected to a magnetic coil and not-shown cables connected t the pressure sensors 7, 8.

In the present embodiment, as shown in FIG. 5A, the center axes X1, X2 are arranged to be orthogonal with the linear edge part 231 of the circumferential wall member 23.

In addition, the connector 25 as one of the connectors 24, 25, which is provided on a side near the cut-out part 32 (a lower side in the vertical direction (see FIG. 4A)) has a quantity of protruding from the circumferential wall member 23 smaller than that of the other collector, i.e., the connector 24.

Further, the connector 25 has, as shown in FIG. 7A, a size smaller than the connector 24 in a shape viewed from the front.

The reservoir 3 includes, as shown in FIG. 2A, the tube-connection opening 3c and connecting flange (not shown) in addition to the fill openings 3a, 3b (see FIG. 1). The tube-connection opening 3c protrudes from the container body 3e for storing the brake fluid to the front. Connected to the tube-connection opening 3c is a hose extending from the main reservoir (not shown). The connecting flange is protrusively formed on a lower surface of the container body 3e and overlapped with the reservoir mounting part 13 (see FIG. 2B) and fixed to a connecting part of the base 10 with a spring pin (not shown).

The master cylinder device A1 having the housing 20 as described above is fixed to the toe board 50 through the bolt 12a extending rearward from the vehicle fixing unit 12 as shown in FIG. 8A.

In this case, a part of the push rod R extending rearward from the vehicle fixing unit 12 extends into the cabin C through the toe board 50.

In the engine room ER, one of the cut-out parts 32 having a larger area is disposed on a front lower part of the base 10.

Figure 8B:
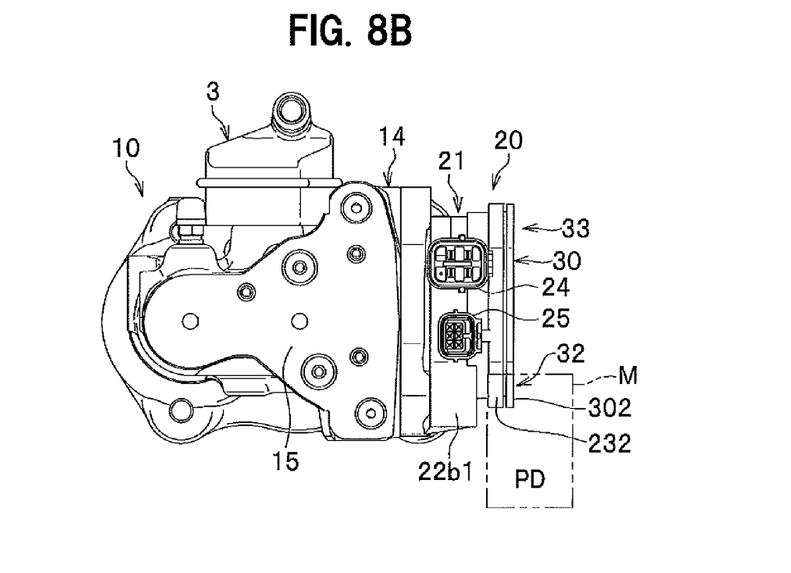

This provides arrangement of the housing 20 near the peripheral structures and the peripheral devices M, which secures a clearance under the cut-out part 32 in the engine room ER (see FIGS. 8A and 8B). In other words, the housing 20 does not become an obstacle against the peripheral structures and the peripheral devices M.

In addition, in a maintenance, etc., when the master cylinder device A1 is removed from the toe board 50, it is possible to perform an operation for removing the master cylinder device A1 using a space formed by the cut-out part 32), so that a good maintenance is provided.

As the structures and peripheral devices M, there are a motor and other structures equipped with an engine. For example, in addition to the devices regarding the brake, there are various devices such as a transmission, a cooling system such as a radiator, and a low voltage battery. This allows the housing 20 to be arranged near such structures and the peripheral device M.

According to the housing 20 of the embodiment described above, the area of the first cut-out part is made greater than that of the second cut-out part, so that space saving is provided according to the difference. Because one of a pair of the first cut-out part is disposed at a front part in a vehicle forward direction and at a lower part in a vertical direction, for example, clearance under the first cut-out part is secured within an engine room, and the housing (a lid member) can be disposed near structures therearound and peripheral devices PD. This enhances a degree of freedom in layout of the inside of the engine room.

Further, because a contour of the lid member is formed in a point symmetrical shape with respect to a center of an opening of a peripheral wall part of the lid member, though the first cut-out part has an area which is different from that of the second cut-out part, this does not cause difference in an arranging direction of the lid member during assembling. This provides easiness in assembling the lid member.

Further, it is possible to arrange the thread through hole 27 near the housing 20 (the circumferential wall member 23). This provides space saving. Further, in the base 10 of the master cylinder device A1, this can shift the position of the hole corresponding to screw to the inside of the base 10. This provides down-sizing of the base 10.

Further, the two connectors 24, 25 are provided at the linear edge part 231 together, which makes it difficult to interfere with the cut-out part 32 and the second cut-out part 33, so that a space formed by the first cut-out part 32 and the second cut-out part 33 can be effectively used. Further, the two connectors 24, 25 are provided at the linear edge part 231 together, which makes it easy to attach and detach the connectors 24, 25.

In addition, because one of the two connectors 24, 25, which is smaller is arranged near the cut-out part 32 having a larger quantity of being cut-out, this facilitates to secure a vacant space at the cut-out part 32 and its peripheral area. Accordingly, this enhances a degree of freedom in designing layout inside the engine room ER.

Further, the hollow parts 30b are provided at a circumferential edge of the lid member 30. This prevents the circumferential edge of the lid member 30 from bending and having distortion when the lid member 30 is fixed by welding, etc. Further, formation of the hollow parts 30b can provide lighting holes at circumferential edge of the lid member 30.

In addition, the number of the hollow parts 30b formed at the cut-out part 32 is greater than the number of the hollow parts 30b formed at the second cut-out parts 33, 33. This preferably prevents the peripheral edge of the lid member 30 from bending and having distortion, particularly at a part of the peripheral edge facing the cut-out parts 32, 32 and the second cut-out parts 33, 33.

Further, because the cut-out parts 32, 32 and the second cut-out parts 33, 33 are formed in triangle shapes, the inclined edge 302 and the inclined edge 303 facing the cut-out part 32 and the second cut-out part 33, respectively are linear. The areas of the cut-out parts are made larger than those in a case where parts of the peripheral edges facing the cut-out parts are formed to protrude outwardly.

Further, the housing 20 is provided at the master cylinder device A1 which is frequently installed inside the engine room ER. This preferably enhances the degree of layout in the engine room ER where it is difficult to secure a large unused space (installation space).

In the embodiment, all of the cut-out parts 32, 32 and the second cut-out parts 33, 33 are formed in triangles. However, only the cut-out parts 32, 32 may be formed in a triangle shape.

Further, it is enough that the number of the hollow parts 30b formed at a part of the circumferential edge facing the cut-out part 32 is made larger than the number of the hollow parts 30b formed at a part of the circumferential edge facing the second cut-out part 33. The number can be arbitrary set.

In the embodiment, the housing 20 mounted on the master cylinder device A1 has been described. However, the present invention is not limited to this, but may be preferably applied to any other housing mounted on the base forming the brake hydraulic device.

DESCRIPTION OF REFERENCE SYMBOLS

10 base
20 housing
21a opening
22a to 22d boss member (mounting screw part)
23 circumferential wall member
24, 25 connectors
30 lid member
30b hollow parts
32 first cut-out part
33 second cut-out part
A1 master cylinder
O center
X1, X2 center axis

The invention claimed is:

1. A housing assembled on one surface of a base configured to be mounted on a vehicle, said housing comprising:
a circumferential wall member enclosing parts provided to the base; and a lid member mounted on the circumferential wall member and covering an opening formed in the wall member on a side of the one surface of the base, wherein
the lid member comprises a contour inscribed on a quadrilateral formed with two pairs of two sides facing each other, and further comprises a pair of first cut-out parts formed by cutting out one of the pair of diagonal corners of the quadrilateral, the first cut-out parts having the same size as one another, and a pair of second cut-out parts formed by cutting out the other of the pair of diagonal corners, the second cut-out parts having the same size as one another, wherein
the contour of the lid member is formed in a point-symmetrical shape with respect to a center of the opening, wherein
an area of the first cut-out part is greater than an area of the second cut-out part, and wherein
a first one of the first cut-out parts is arranged at a part which is configured to be situated in the front direction of the vehicle and a second one of the first cut-out parts is configured to be situated at a position low in the vertical direction when the base is mounted on the vehicle.

2. The housing as claimed in claim 1, further comprising a plurality of boss members in which the thread through holes are formed, wherein at least a part of each of the thread through holes is arranged in a respective one of the boss members proximate at least one of the first cut-out parts or the second cut-out parts.

3. The housing as claimed in claim 1, wherein the circumferential wall member is provided with a plurality of connectors thereon protrusively, and wherein center axis lines of the connectors are arranged orthogonally with one of the sides of the circumferential wall member.

4. The housing as claimed in claim 3, wherein the plurality of connectors comprise two connectors protrusively mounted on the circumferential wall member, wherein
the two connectors are protrusively arranged in the front direction of the vehicle between the first cut-out part, arranged at a part which is configured to be situated in the front direction of the vehicle, and a part which is low in the vertical direction when the base is mounted on the vehicle and one of the second cut-out parts is arranged at an upper part in the vertical direction when the base is mounted on the vehicle, and wherein
one of the connectors provided on a side near the first cut-out part has a quantity of protrusion from the circumferential wall which is smaller than a quantity of protrusion of the other of the connectors from the circumferential wall.

5. The housing as claimed in claim 1, wherein the lid member includes a plurality of hollow parts formed therein at a circumferential edge of the lid member, and wherein a number of the hollow parts formed in the circumferential edge facing the first cut-out part is greater than a number of the hollow parts formed in the circumferential edge of the lid member facing the second cut-out part.

6. The housing as claimed in claim 1, wherein at least one of the first cut-out part and the second cut-out part is formed in a triangle shape.

7. The housing as claimed in claim 1, wherein the base is mounted on a master cylinder device to which an operation on a brake controller is inputted.

8. A master cylinder device, a part of which is arranged in an engine room, the master cylinder device being arranged in the engine room provided with a housing for housing parts, the housing comprising: a circumferential wall member enclosing the parts provided to the base and a lid member a lid member mounted on the circumferential wall member and covering an opening formed on a side of one of the surfaces of the base, wherein
the lid member comprises a contour inscribed on a quadrilateral formed with two pairs of two sides, and further comprises a pair of first cut-out parts formed by cutting out one of the pair of diagonal corners of the quadrilateral, the first cut-out parts having the same size as one another, and a pair of second cut-out parts formed by cutting out the other of the pair of diagonal corners, the second cut-out parts having the same size as one another, wherein
the contour of the lid member is formed in a point-symmetrical shape with respect to a center of the opening, wherein an area of the first cut-out parts is greater than an area of the second cut-out parts, and wherein one of the pairs of the first cut-out parts is arranged at a part of the base which is configured to be situated in the front direction of the vehicle and low in the vertical direction when the base is mounted on the vehicle.

* * * * *